US010336247B2

(12) United States Patent
Ault et al.

(10) Patent No.: US 10,336,247 B2
(45) Date of Patent: Jul. 2, 2019

(54) APPARATUS AND METHOD FOR AUTOMATIC APPLICATION/DEAPPLICATION OF BRAKE LIGHTS (71) Applicant: Deceleration Technologies, LLC, Mountain, ND (US)

(72) Inventors: Scott Thomas Ault, Reynolds, ND (US); Darren Roger Olafson, Edinburg, ND (US); Brad Driscoll, East Grand Forks, MN (US)

(73) Assignee: Deceleration Technologies, LLC, Mountain, ND (US)

( * ) Notice: Subject to any disclaimer, the term of this patent is extended or adjusted under 35 U.S.C. 154(b) by 138 days.

(21) Appl. No.: 15/633,351

(22) Filed: Jun. 26, 2017

(65) Prior Publication Data
US 2017/0368988 A1 Dec. 28, 2017

Related U.S. Application Data (60) Provisional application No. 62/355,084, filed on Jun. 27, 2016.

(51) Int. Cl.
*B60Q 1/44* (2006.01)
*G08G 1/16* (2006.01)
*B60Q 1/00* (2006.01)

(52) U.S. Cl.
CPC .............. *B60Q 1/44* (2013.01); *B60Q 1/448* (2013.01); *B60Q 1/0094* (2013.01); *G08G 1/164* (2013.01)

(58) Field of Classification Search
CPC ........ B60Q 1/44; B60Q 1/448; B60Q 1/0094; G08G 1/164
See application file for complete search history.

(56) References Cited

U.S. PATENT DOCUMENTS

| 1,156,453 A | 10/1915 | Banes |
| 1,256,134 A | 2/1918 | Joeck |
| 2,100,105 A | 11/1937 | Lee et al. |

(Continued)

FOREIGN PATENT DOCUMENTS

| WO | 2001091996 A1 | 8/2011 |
| WO | 2013060508 A1 | 5/2013 |

*Primary Examiner* — Thomas Ingram
(74) *Attorney, Agent, or Firm* — Kinney & Lange, P.A.

(57) ABSTRACT

Apparatus and associated methods include automatically activating and/or deactivating a vehicle's standard brake lights in response to signals indicative of the vehicle's speed. The signals indicative of a vehicle's speed are received from a vehicle communications bus. In some embodiments, a deceleration value is calculated based on a series of signals indicative of a vehicle's speed received from the vehicle communications bus. The calculated deceleration value is compared with a first predetermined deceleration threshold. If the calculated deceleration value is greater than the first predetermined deceleration threshold, a brake light activation signal is generated. When the vehicle no longer is decelerating or the computed deceleration value falls below a second predetermined deceleration threshold, a brake light deactivation signal is generated. The automatic activation/deactivation of a vehicle's standard brake light may advantageously provide improved safety to following vehicles and drivers.

21 Claims, 5 Drawing Sheets

(56) References Cited

U.S. PATENT DOCUMENTS

| | | |
|---|---|---|
| 2,156,751 A | 5/1939 | Collins |
| 2,751,575 A | 6/1956 | Jacobs et al. |
| 2,982,944 A | 5/1961 | Weller |
| 3,431,556 A | 3/1969 | Johnson |
| 3,659,268 A | 4/1972 | Crawford |
| 4,107,647 A | 8/1978 | Yoshino |
| 5,717,377 A | 2/1998 | Gao |
| 5,753,752 A | 7/1998 | Bucalo et al. |
| 6,100,799 A | 8/2000 | Fenk |
| 6,225,896 B1 | 5/2001 | Sendowski |
| 6,239,696 B1 | 5/2001 | Berger et al. |
| 6,249,219 B1 | 6/2001 | Perez et al. |
| 6,278,364 B1 | 8/2001 | Robert |
| 6,417,767 B1 | 7/2002 | Carlson et al. |
| 6,424,256 B1 | 7/2002 | Ryder |
| 6,587,044 B2 | 7/2003 | Ehrlich et al. |
| 6,628,197 B1 * | 9/2003 | Poguntke ............... B60Q 1/44 340/463 |
| 6,864,786 B2 | 3/2005 | Speckhard et al. |
| 6,870,474 B1 | 3/2005 | Brothers |
| 6,885,294 B1 | 4/2005 | Tonkin |
| 6,911,905 B2 | 6/2005 | Carlson et al. |
| 6,933,837 B2 | 8/2005 | Gunderson et al. |
| 7,002,460 B2 | 2/2006 | Bolander et al. |
| 7,154,387 B2 | 12/2006 | Boomershine, III |
| 7,155,329 B2 | 12/2006 | Mepham et al. |
| 7,495,550 B2 | 2/2009 | Huang et al. |
| 7,646,290 B2 | 1/2010 | Wey et al. |
| 7,698,040 B2 | 4/2010 | Long |
| 8,441,347 B2 | 5/2013 | Marlowe et al. |
| 8,482,397 B1 * | 7/2013 | Tajiri .................. B60Q 1/44 340/441 |
| 8,587,424 B2 | 11/2013 | Aberizk |
| 8,700,285 B2 | 4/2014 | Barlsen et al. |
| 9,013,292 B2 | 4/2015 | Aberizk |
| 2003/0116077 A1 | 6/2003 | Bucalo et al. |
| 2003/0122663 A1 | 7/2003 | Carlson et al. |
| 2004/0160315 A1 | 8/2004 | Speckhart et al. |
| 2005/0261819 A1 | 11/2005 | Mepham et al. |
| 2006/0074540 A1 | 4/2006 | Braunberger et al. |
| 2006/0125617 A1 * | 6/2006 | Zimmermann .......... B60Q 1/44 340/467 |
| 2007/0016348 A1 | 1/2007 | Long |
| 2008/0023273 A1 * | 1/2008 | Toelge .................. B60Q 1/444 188/1.11 E |
| 2014/0354422 A1 * | 12/2014 | Olson .................... B60Q 1/445 |
| 2018/0009372 A1 * | 1/2018 | Hammock ............... B62J 6/04 |

* cited by examiner

APPARATUS AND METHOD FOR AUTOMATIC APPLICATION/DEAPPLICATION OF BRAKE LIGHTS

BACKGROUND

Vehicular travel is ubiquitous in modern society. Our culture is built around transportation of people and goods. Many people travel upon roads to get to places of employment, to purchase goods that they want or need, to transport such purchased goods, to frequent service providers, to meet with friends, family, and fellow worshippers, and for myriad other purposes. Whether traffic is heavy or light, dangers abound on the roads and highways. Traffic accidents occur every day. Cars are damaged, and people are injured in some of these accidents.

Rear-end accidents are a common type of accident. Some rear-end accidents happen because a driver follows a vehicle too closely. Some rear-end accidents happen because a following driver is not paying attention to traffic ahead. Some rear-end accidents happen because a following driver may not know the speed and/or deceleration condition of the vehicle he/she is following. Ignorance of a speed and/or deceleration condition can also result in undesirable traffic patterns. Drivers may follow vehicles too closely because of such ignorance. Repetitive accordion-style traffic compressions and expansions can result from such ignorance.

SUMMARY

A brake light control system includes a control module configured to electrically connect to a vehicle communications port. The control module is physically supported by the vehicle communications port, when electrically connected. The brake light control system includes a signal detection module configured to receive a series of vehicle speed signals transmitted to the vehicle communications port. The brake light control system includes a deceleration calculation module configured to calculate deceleration based on the received series of vehicle speed signals. The brake light control system also includes a signal generation module configured to generate a brake light activation signal based on a comparison between the calculated deceleration and a predetermined threshold. The brake light activation signal is configured to cause a brake light activation system to activate a standard brake light of a vehicle.

A method for activating a vehicle's brake lights includes the step of electrically connecting a control module to the vehicle communications port. The method includes the step of receiving a series of vehicle speed signals transmitted to the vehicle communications port. The method includes the step of calculating a vehicle deceleration based on the received series of vehicle speed signals. The method includes the step of generating a brake light activation signal based on a comparison between the calculated deceleration and a predetermined threshold. The method also includes the step of outputting the generated brake light activation signal to the vehicle communications bus.

A vehicle brake light control system includes a control module having a non-transitory computer usable medium having a computer readable program code embodied therein. The computer readable program code is adapted to be executed to implement a method for activating a vehicle's brake lights. The method includes receiving a series of vehicle speed signals. The method includes calculating a vehicle deceleration based on the received series of vehicle speed signals. The method includes comparing the calculated vehicle deceleration with a predetermined threshold. The method includes generating a brake light activation signal if the comparing step indicates that the deceleration is greater than the predetermined threshold. The method also includes outputting the generated brake light activation signal.

DETAILED DESCRIPTION

Some vehicles today (e.g., on-highway trucks, off-highway equipment, agricultural equipment, construction equipment, etc.) are equipped with on-vehicle controller area networks to facilitate communications between various vehicle sensors, modules, and/or systems. Such sensors, modules, and systems may transmit electronic signals and control information among the other sensors, modules, and systems connected via an on-vehicle controller area network. Some sensors can detect various parameters within a vehicle (e.g., timing sensors, shaft speed sensors, temperature sensors, pressure sensors, etc.). These parameters may be used by the sensor, module, or system that detected them. Such sensors can be connected directly to one of various control modules or vehicle systems. Electrical signals indicative of the detected parameters can be transmitted to other controller-area-network connected devices.

Such controller-area-network connected systems include an Engine Control Module (ECM) or Engine Control Unit (ECU), a Transmission Control Module (TCM), and a Chassis Control Module (CCM). An ECM, for example, can receive various signals indicative of information pertaining to the vehicle (e.g., coolant temp, RPM, fault codes, etc.). These signals indicative of vehicle information may have been placed on the controller area network by other sensors, modules, and/or systems. Also, the ECM may be able to transmit control signals and/or signals indicative of vehicle information to other sensors, modules, and/or systems (e.g., a display module, dashboard indicators, a diagnostic tool, etc.).

The TCM, for example, may be hardwired directly to a shaft speed sensors, gear indicators, etc., and may calculate a vehicle speed based on signals from these hardwired devices. The TCM may then output this information to the controller area network to be received and/or used by other modules connected thereto. This information may be used by these other modules, for example, to govern engine speed, display ground speed, actuate control members, and/or for use in calculating other vehicle metrics.

The Chassis Control Module may monitor and processing vehicle control members operated by a driver (e.g., steering wheels, foot pedals, turn signal levers, dashboard buttons, etc.), monitor and/or control cab temperature, monitor and/or actuate various vehicle lights.

The various sensors, modules and systems may function as a distributed electronic computing system that operates on various subsystems within a vehicle. Each control module is directly connected to various sensors. The microprocessors in the control modules turn raw data provided by various sensors into standard messages that are then shared with other control modules via the on-vehicle controller area network. The control modules can be strategically placed throughout the vehicle to minimize the amount of wiring required, and/or to be localized proximate transducers or sensors related to their functional purposes.

Various types, protocols and standards of on-vehicle controller area networks may be used. In an exemplary embodiment, a J1939 CANbus may be utilized to facilitate intra-vehicular communications. In some embodiments, Bluetooth communications can be used. In some embodiments, RS485 and/or RS232 protocols and standards may be used. In some embodiments various combinations of these and other on-vehicle controller area networks having various protocols and standards may be used. These on-vehicle controller area networks and the signals carried thereon can be used to augment the number of conditions that brake lights are activated. Such an augmentation of brake light activation can provide a more comprehensive set of visual communications to trailing vehicles.

Figure 1:
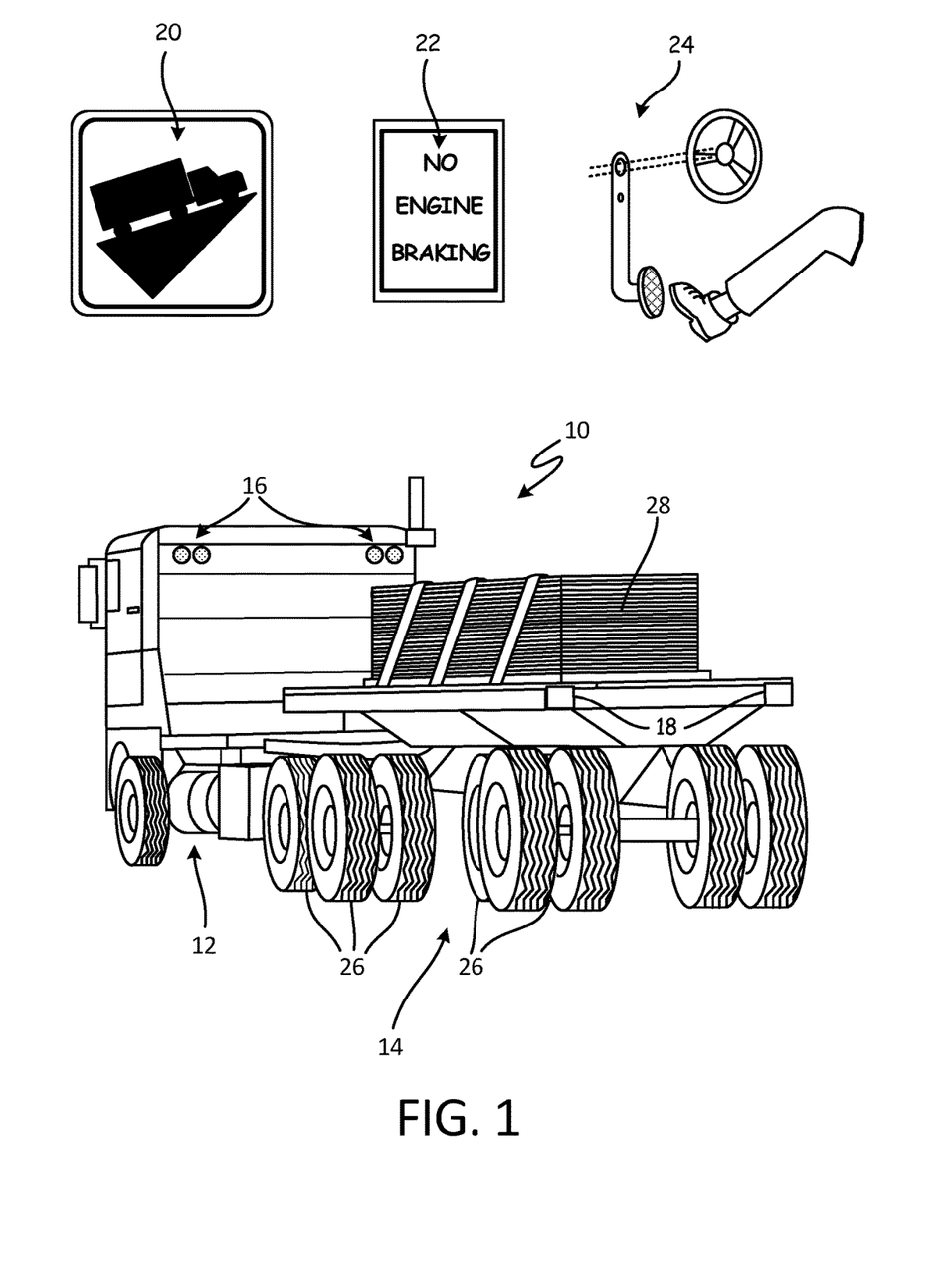
FIG. 1 is a schematic view of various vehicle conditions in which a truck's brake lights are actuated using an exemplary brake light control system.

FIG. 1 is a schematic view of various vehicle conditions in which a truck's brake lights are actuated using an exemplary brake light control system. In FIG. 1, tractor-trailer 10 has tractor 12 and trailer 14, which have brake lights 16 and 18, respectively. Current vehicles are with a system for activating brake lights 16, 18 in response to physical depression a brake lever. Tractor 12 is further equipped with a system for automatically controlling brake lights 16, 18 in response to a computed vehicle deceleration that is greater than a predetermined threshold. The system for automatically controlling brake lights 16, 18 calculates deceleration of tractor-trailer 10. The system for automatically controlling brake lights 16, 18 may be configured to actuate the brake lights under certain deceleration conditions. For example, the system for automatically controlling brake lights 16, 18 may control brake lights 16, 18 such that when tractor-trailer 10 is decelerating at greater than a first deceleration threshold, brake lights 16, 18 will illuminate. The system for automatically controlling brake lights 16, 18 may control brake lights 16, 18 such that when tractor-trailer 10 is no longer decelerating, or is decelerating at less than a second deceleration threshold, brake lights 16, 18 will not illuminate.

Various vehicle and road conditions symbolized by icons 20, 22, 24 may contribute to deceleration of tractor-trailer 10. For example, steep grade road condition, symbolized by icon 20, can contribute to a deceleration of tractor-trailer 10, even if a driver of tractor-trailer 10 is controlling a throttle position that causes an engine of tractor-trailer 10 to power drive wheels 26 of tractor 12. Steep grade road condition, symbolized by icon 20, can help cause tractor-trailer 10 to decelerate, especially if tractor-trailer 10 is carrying load 28 that is very heavy. Another condition that may contribute to deceleration of tractor-trailer 10 is engine braking, symbolized by icon 22. Engine braking, symbolized by icon 22, can cause tractor-trailer 10 to decelerate, if tractor-trailer 10 is equipped with engine braking capabilities, such as, for example, Jake braking or exhaust braking. Engine braking, symbolized by icon 22, traditionally does not cause brake lights 16, 18 to activate. But should engine braking, symbolized by icon 22, result in deceleration of tractor-trailer 10 that exceeds the first predetermined threshold, the system for automatically controlling brake lights 16, 18 may cause brake lights 16, 18 to illuminate, none-the-less. Another condition that may contribute to deceleration is depressing a brake pad, symbolized by icon 24. This traditional method of braking can result in deceleration detection by use of the first deceleration threshold. Such detection can be used instead of or in addition to a traditional brake-pedal position sensor.

Automatically controlling brake lights 16, 18 may provide more comprehensive brake light illumination than traditional methods. Automatically controlling brake lights 16, 18 may result in brake-light illumination that is better correlated to a vehicle's actual deceleration than traditional methods. Such comprehensive brake-light illumination may indicate to drivers in following vehicles that tractor-trailer 10 is decelerating, even when the driver of tractor-trailer 10 is not depressing brake pedal, symbolized by icon 24. Systems for automatically controlling brake lights may provide customizable brake light illumination. For example, a user may select conditions and/or condition parameters that will result in illumination of brake lights 16, 18. Such conditions may augment the traditional illumination resulting from brake pedal depression. Such conditions may include vehicle speed and/or deceleration conditions, throttle position conditions, timing conditions, etc.

Figure 2A:
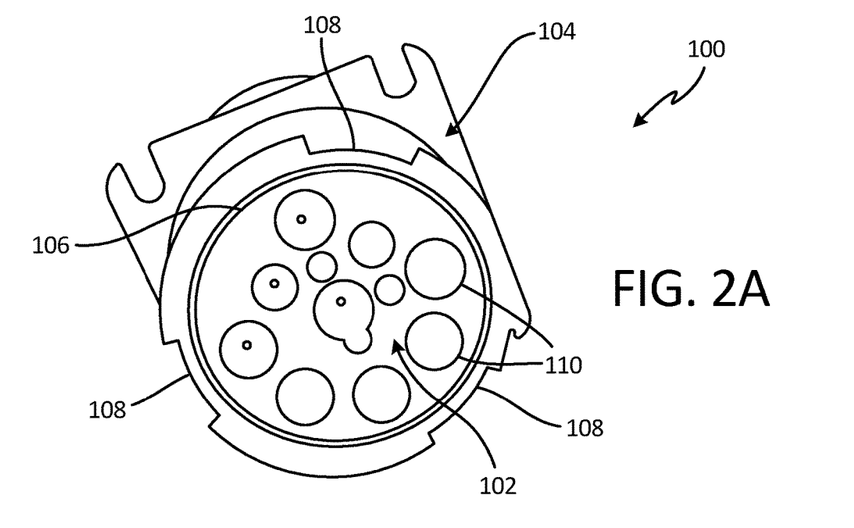
FIGS. 2A-2B are perspective views of an exemplary vehicle communications port and a corresponding brake light control module, respectively.
Figure 2B:
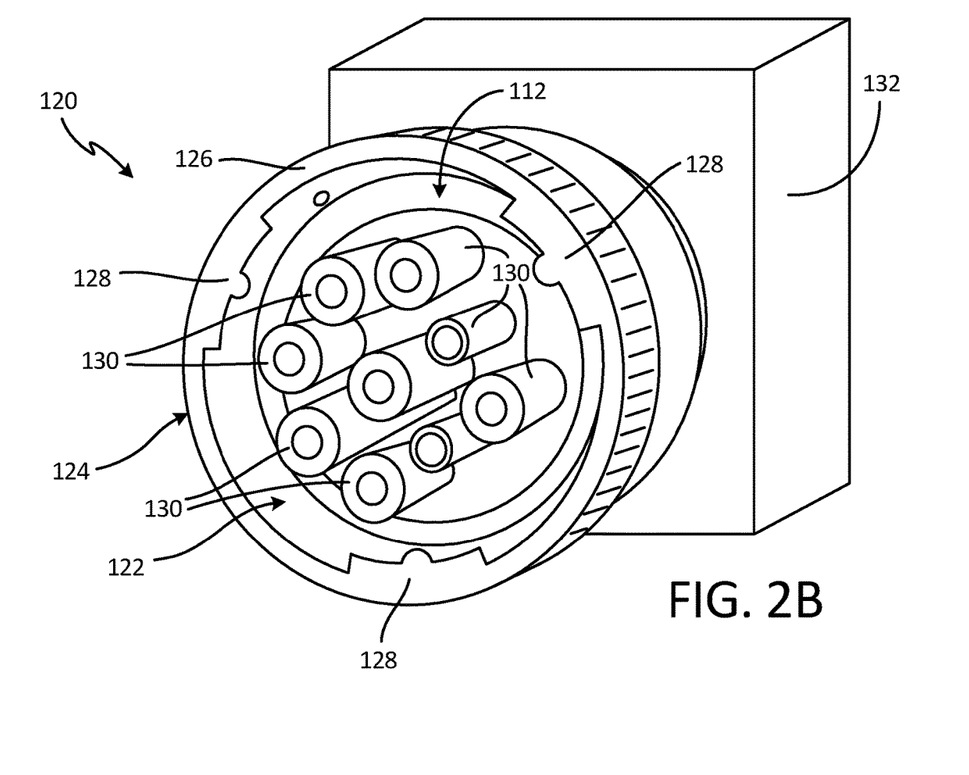

FIGS. 2A-2B are perspective views of an exemplary vehicle communications port and a corresponding brake light control module, respectively. In FIG. 2A, vehicle communications port 100 includes electrical interface 102 and mechanical interface 104. Vehicle communications port 100 may be mounted, for example underneath a dashboard of a vehicle. In some embodiments, vehicle communications port 100 may be mounted in a glove compartment of a vehicle. Mechanical interface 104 has cylindrical body 106 with outwardly facing tabs 108 configured to engage a complementary connector. Electrical interface 102 has nine pin-receiving cavities 110. Each of pin receiving cavities 110 is configured to mechanically receive a complementary connecting pin. Various embodiments have various configurations of mechanical interface 104 and electrical interface 102. Vehicle communications port 100 is in electrical communication with an on-board controller area network of a vehicle.

In FIG. 2B, exemplary brake light control module 120 includes electrical interface 122 and mechanical interface 124. Brake light control module 120 is configured to mechanically connect to vehicle communications port 100. When connected to vehicle communications port 100, brake light control module 120 is physically supported by vehicle communications port 100. Mechanical interface 124 has cylindrical wall 126 with inwardly facing tabs 128. Cylindrical wall 126 defines a cylindrical cavity 112 configured to receive cylindrical body 106 of vehicle communications port 100.

An electronic brake light controller (not depicted) can reside in an electronics bay with housing 132. The electronic brake light controller, when connected to the vehicle communications port, receives and transmits electrical signals from and to an on-vehicle controller area network via vehicle communications port 100, respectively. Thus, when brake light control module 120 is connected to vehicle communications port 100, the electronic brake light control system is in electrical communication with various engine and/or vehicle transducers, vehicle operation actuators, and engine and/or vehicle control units, via electrical interfaces 102, 122. The electronic brake light control system receives and sends signals from and to these listed and other engine and/or vehicle components, respectively.

Mechanical interface 124 and electrical interface 122 are coordinated so that when brake light control module 120 is mechanically connected to vehicle communications port 100, electrical interface 122 provides electrical communication between brake light control module 120 and vehicle communications port 100. In the depicted embodiment, electrical interface 122 includes pins 130 configured to engage receiving cavities 110 when brake light control module 120 is mechanically connected to vehicle communications port 100. Electrical interface 122 is located on a side of brake light control module 120 facing vehicle communications port 100, when connected thereto.

In some embodiments, brake light control module 120 has a second electrical interface on a side facing away from vehicle communications port 100, when connected thereto. Such embodiments may present an electrical interface substantially the same as electrical interface 102 so that additional components can be in electrical communication with vehicle communications port 100. An additional component can be connected to brake light control module 120 via the second electrical interface, while brake light control module 120 is connected to vehicle communications port 100. In such embodiments, brake light control module 120 may also have a second mechanical interface on the side facing away from vehicle communications port 100, when connected thereto. Such embodiments may present a mechanical interface substantially the same as mechanical interface 104.

In some embodiments, either or both of complementary electrical interfaces 102, 122 and complementary mechanical interfaces 104, 124 may be of a different form. In some embodiments, brake light control module includes electronics and/or software that perform automatic control of a vehicle's standard brake lights, as will be detailed below. In some embodiments, a vehicle's engine control unit may be adapted to automatically control a vehicle's standard brake lights. In such embodiments, the engine and/or chassis control unit may be electronically configured and/or programmed to perform automatic control of the vehicle's standard brake lights. In such embodiments, connection of a physical module to vehicle communications port may not be required for automatic control of a vehicle's standard brake lights.

Figure 3:
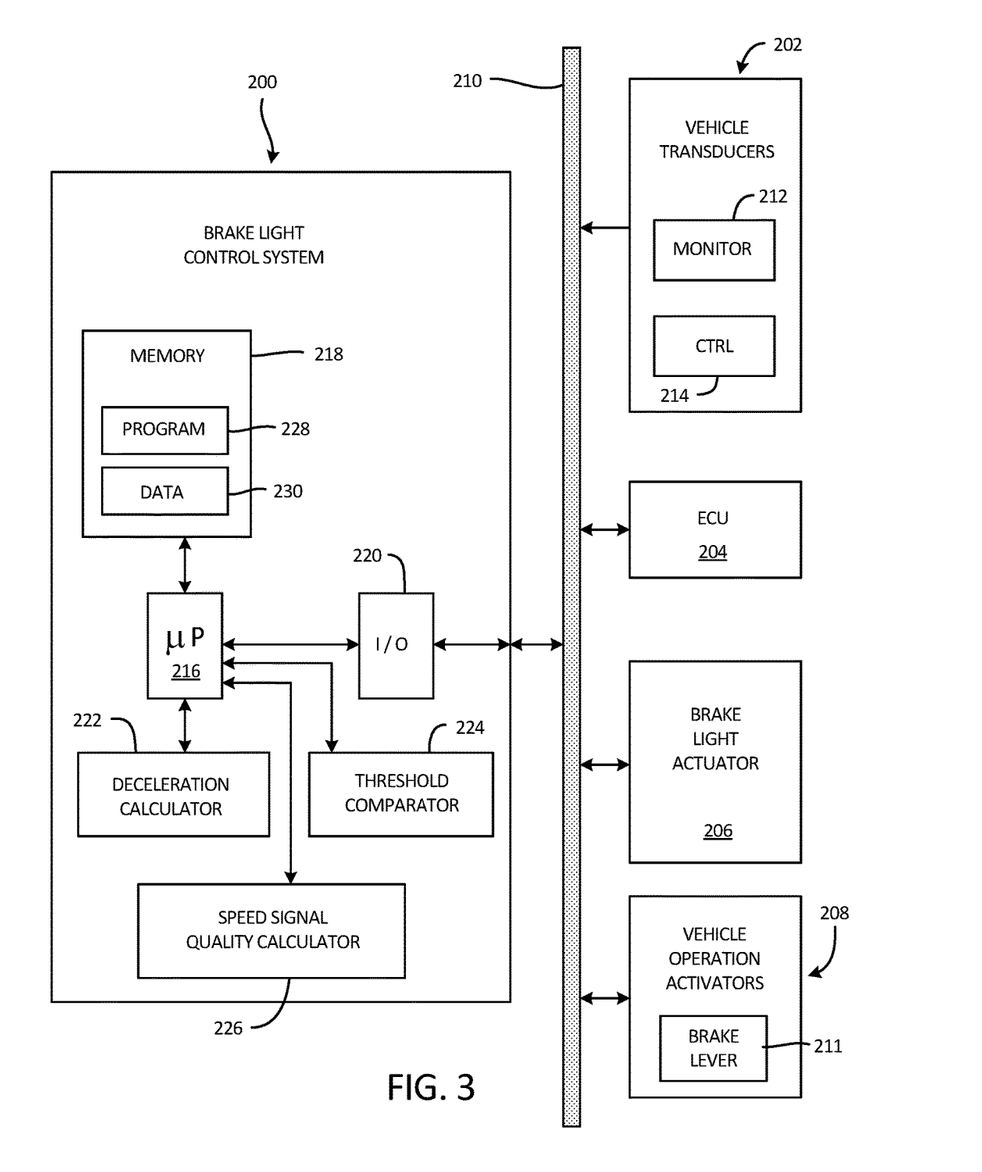
FIG. 3 is a block diagram of an exemplary brake light control system.

FIG. 3 is a block diagram of an exemplary brake light control system. In FIG. 3, brake light control system 200 is in electrical communication with vehicle transducers 202, engine control unit 204, brake light actuator 206, and vehicle operation actuators 208 via vehicle communications bus 210. In some embodiments, brake light control system 200 is part of brake light control module 120, depicted in FIG. 2B. Vehicle transducers 202 include vehicle sensors and/or monitors 212 and vehicle control transducers 214. Various vehicle sensors and/or monitors 212 may provide electrical signals indicative of various monitored and/or measured vehicle parameters to vehicle communications bus 210. Some vehicle sensors and/or monitors may provide signals indicative of a vehicle's speed. For example, an anti-lock brake sensor and/or a transmission shaft speed sensor may provide a signal indicative of a vehicle's speed. vehicle transducers 202, engine control unit 204, brake light actuator 206, and vehicle operation actuators 208 can usually be found in various within a vehicle. Such vehicle components share communications bus 210 for sending and/or receiving electrical signals indicative of various vehicle parameters.

Engine control unit 204 may receive various signals provided to vehicle communications bus. The signals received by engine control unit 204 may then be processed by engine control unit 204, which then may provide control signals to vehicle control transducers 214 via vehicle communications bus 210. Engine control unit 204 may also generate a vehicle speed signal and provide it to vehicle communications bus 210. In some embodiments engine control unit 204 can provide automatic control of a vehicle's standard brake lights. In such embodiments, engine control unit 204 may provide brake light activation and/or deactivation signals to vehicle communications bus 210. Brake light actuator 206 may receive the brake light activation and/or deactivation signals from vehicle communications bus 210. In response to receiving activation and/or deactivation signals from vehicle communications bus 210, brake light actuator 206 may then control operating power to a vehicle's standard brake lights.

Vehicle operation actuators 208 may also provide signals to vehicle communications bus 210. Vehicle operation actuators 208 can include driver operated actuators, such as, for example, throttle position, and brake lever position 211. A brake lever position sensor may provide a signal indicative of a brake lever position to vehicle communications bus 210, for example. A throttle position sensor may provide a signal indicative of a throttle position to vehicle communications bus 210, for example.

Brake light control system 200 may receive various signals provided to vehicle communications bus 210. Brake light control system 200 may then process the signals received from vehicle communications bus 210 to generate brake light control signals. Brake light control system 200 includes microprocessor 216, memory 218, input/output buffer 220, deceleration calculator 222, threshold comparator 224, and speed signal quality calculator 226. Memory 216 includes program memory 228 and data memory 230.

Microprocessor 216 can be programmed to control a vehicle's brake lights using a variety of methods, some of which will be detailed below. For example, microprocessor 216 may retrieve program instructions from program memory 228. Microprocessor 216 may then receive signals indicative of a vehicle's speed from communications bus 210 via input/output buffer 220. In some embodiments, microprocessor 216 may receive signals indicative of a vehicle's speed from one source, or from more than one source. In some embodiments, microprocessor 216 sends the signals indicative of a vehicle's speed received from multiple sources to speed signal quality calculator 226. Speed signal quality calculator 226 may select one of the sources from the multiple sources of signals indicative of the vehicle's speed to be used by deceleration calculator 222 for calculating a deceleration of the vehicle.

The speed signal quality calculator 226 may send a signal indicative of the selected one of the multiple sources to microprocessor 216. Microprocessor 216 may then send the received signal from the selected one of the multiple sources to deceleration calculator 222. Deceleration calculator 222 then processes the signal indicative of the vehicle's speed sent from the selected source and calculates a deceleration of the vehicle. Deceleration calculator 222 then sends a signal indicative of the vehicle's deceleration to microprocessor 216. Microprocessor 216 may then retrieve one or more predetermined thresholds from data memory 230. Then, microprocessor 216 may send the signal indicative of the vehicle's deceleration, along with the one or more predetermined thresholds to threshold comparator 224. Threshold comparator 224 compares the signal indicative of the vehicle's deceleration with the one or more predetermined thresholds. Threshold comparator 224 sends signals indicative of the results of these comparisons to microprocessor 216.

Based on these signals indicative of the comparison results, microprocessor 216 generates signals to control the vehicle's brake lights. Microprocessor 216 may then send the generated signals to vehicle communications bus 210 via input/output buffer 220. These generated signals may include an address indicative of intended recipient brake light actuator 206, for example. Brake light actuator 206 activates and/or deactivates the vehicle's standard brake lights in response the received signals generated by microprocessor 216.

In some embodiments, brake light control system 200 may be embodied in brake light control module 120. In such embodiments, electrical communication between brake light control system 200 and vehicle communications bus 210 may be enabled by connecting brake light control module 120 to vehicle communications port 100. In some embodiments, one or more of the functions performed by deceleration calculator 222, threshold comparator 224, and speed signal quality calculator 226 may be performed by microprocessor 216. In some embodiments, automatic control of a vehicle's standard brake lights may be performed by engine control unit 204.

Figure 4:
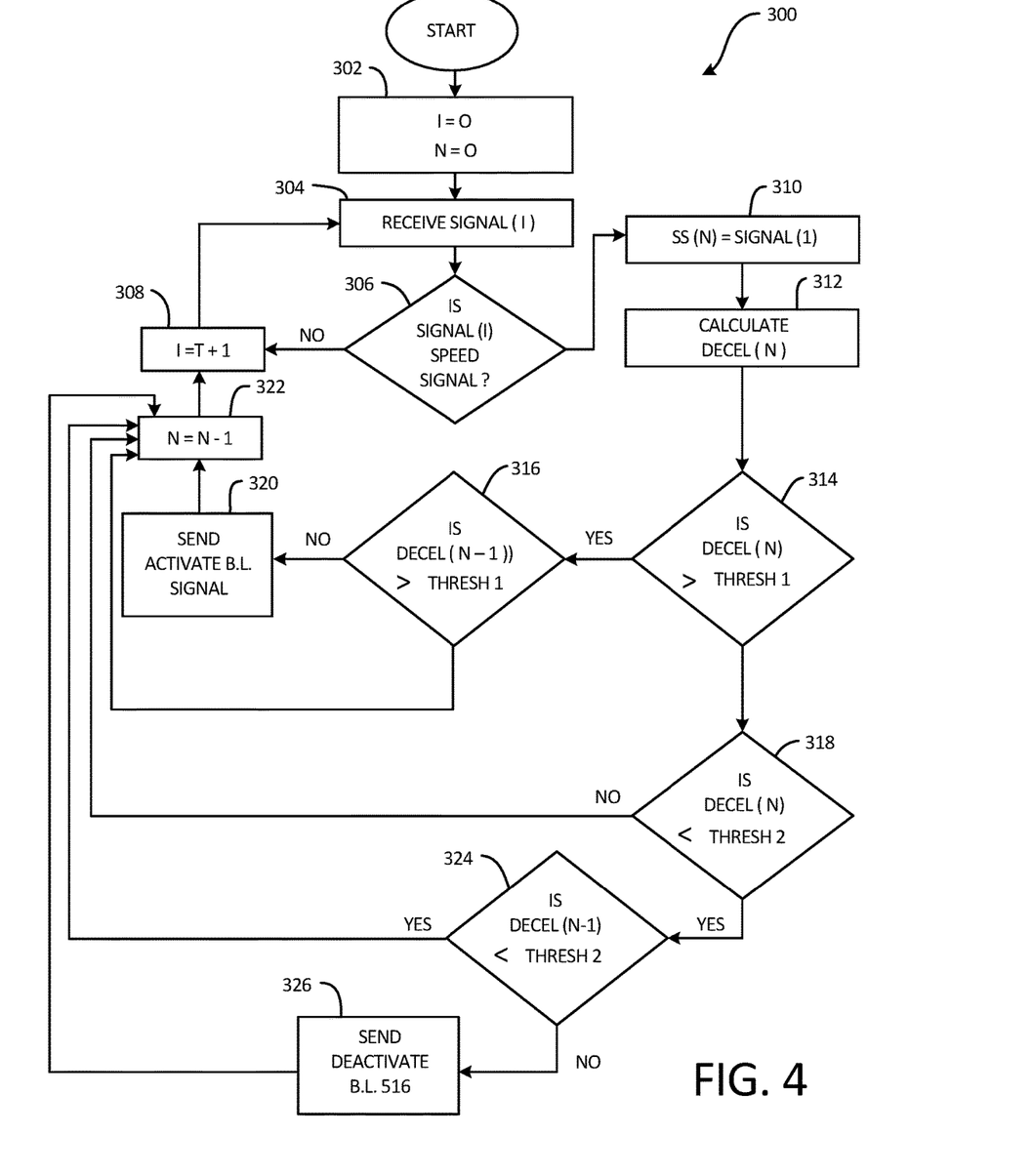
FIG. 4 is a flow chart of an exemplary method for automatically actuating a vehicle's brake lights.

FIG. 4 is a flow chart of an exemplary method for automatically actuating a vehicle's brake lights. In FIG. 4, method 300 for automatically actuating a vehicle's standard brake lights is detailed from the vantage point of microprocessor 216 of FIG. 3. Method 300 begins at step 302, in which step indices I and N are initialized to zero. Then, at step 304, microprocessor receives signal(I) from vehicle communications bus 210. Then, at step 306, microprocessor 216 evaluates whether signal(I) is a speed signal. In some embodiments, signal(I) contains a tag indicative of a type of signal.

In some embodiments, vehicle communications bus 210 may be implemented as a J1939 Controller Area Network (CAN) bus. On some trucks, vehicle communications buses 210 and/or vehicle communications ports 100 operate using J1939 protocols and/or using CAN bus protocols. Messages on the CAN bus may contain a CAN identification (ID). CAN IDs may have a Parameter Group Number (PGN) defining a data type and/or a CAN bus device source address. The J1939 protocol, for example, may identify the vehicle speed using a PGN of 0xFEF1. Multiple sources, each having a unique source address may send communications having a PGN value of 0xFEF1, if each of these communications includes signals indicative of the vehicle's speed. In such embodiments the PGN value can serve as the tag indicative of the type of signal received by microprocessor 216.

Then, at step 306, microprocessor 216 compares the tag indicative of the type of signal with a predetermined value indicative of a speed signal. If, at step 306, signal(I) does not have a tag indicative of a speed signal, the method proceeds to step 308. At step 308, microprocessor 216 increments index I and then method 300 returns to step 304 and awaits the next signal(I). If, however, at step 306, signal(I) has a tag indicative of a speed signal, the method proceeds to step 310. At step 310, Speed Signal SS(N) is equated to signal(I). Then, at step 312, microprocessor 216 calculates the vehicle's deceleration DECEL(N) based on a series of speed signals SS(M . . . N). At step 314, microprocessor 216 compares the calculated DECEL(N) with a first predetermined threshold THRESH1. If, at step 314, the calculated DECEL(N) is greater than THRESH1, method 300 proceeds to step 316. If, however, at step 314, the calculated DECEL(N) is not greater than THRESH1, method 300 proceeds to step 318.

At step 316, microprocessor 216 compares the immediately preceding calculated DECEL(N−1) with THRESH1. If, at step 316, immediately preceding calculated DECEL(N−1) is not greater than THRESH1, method 300 proceeds to step 320. At step 320, microprocessor 216 sends a signal to activate the vehicle's brake lights to vehicle communications bus 210. If, however, at step 318, immediately preceding calculated DECEL(N−1) is greater than THRESH1, there is no need to send a signal to activate the vehicle's brake lights, as a preceding step has presumably already done so. Method 300 proceeds to step 322 after step 318 if preceding calculated DECEL(N−1) is greater than THRESH1, and after step 320. At step 322, microprocessor 216 increments index N. After step 322, method 300 returns to step 308 and increments index I.

If at step 314, the calculated DECEL(N) was not greater than THRESH1, method 300 proceeds to step 318. At step 318, microprocessor 216 compares the calculated DECEL(N) with a second predetermined threshold THRESH2. THRESH2 is typically less than THRESH1 so that hysteresis is employed when activating/deactivating a vehicle's brake lights. If, at step 318, DECEL(N) is not less than THRESH 2, then method 300 returns to step 322 and increments index N.

If, however, at step 318, DECEL(N) is less than THRESH 2, then method 300 proceeds to step 324. At step 324, microprocessor 216 compares the immediately preceding calculated DECEL(N−1) with THRESH2. If, at step 324, immediately preceding calculated DECEL(N−1) is not less than THRESH2, method 300 proceeds to step 326. At step 326, microprocessor 216 sends a signal to deactivate the vehicle's brake lights to vehicle communications bus 210. If, however, at step 324, immediately preceding calculated DECEL(N−1) is less than THRESH2, there is no need to send a signal to deactivate the vehicle's brake lights, as a preceding step has presumably already done so. Method 300 returns to step 322 after step 324 if preceding calculated DECEL(N−1) is less than THRESH2, and after step 326.

Figure 5:
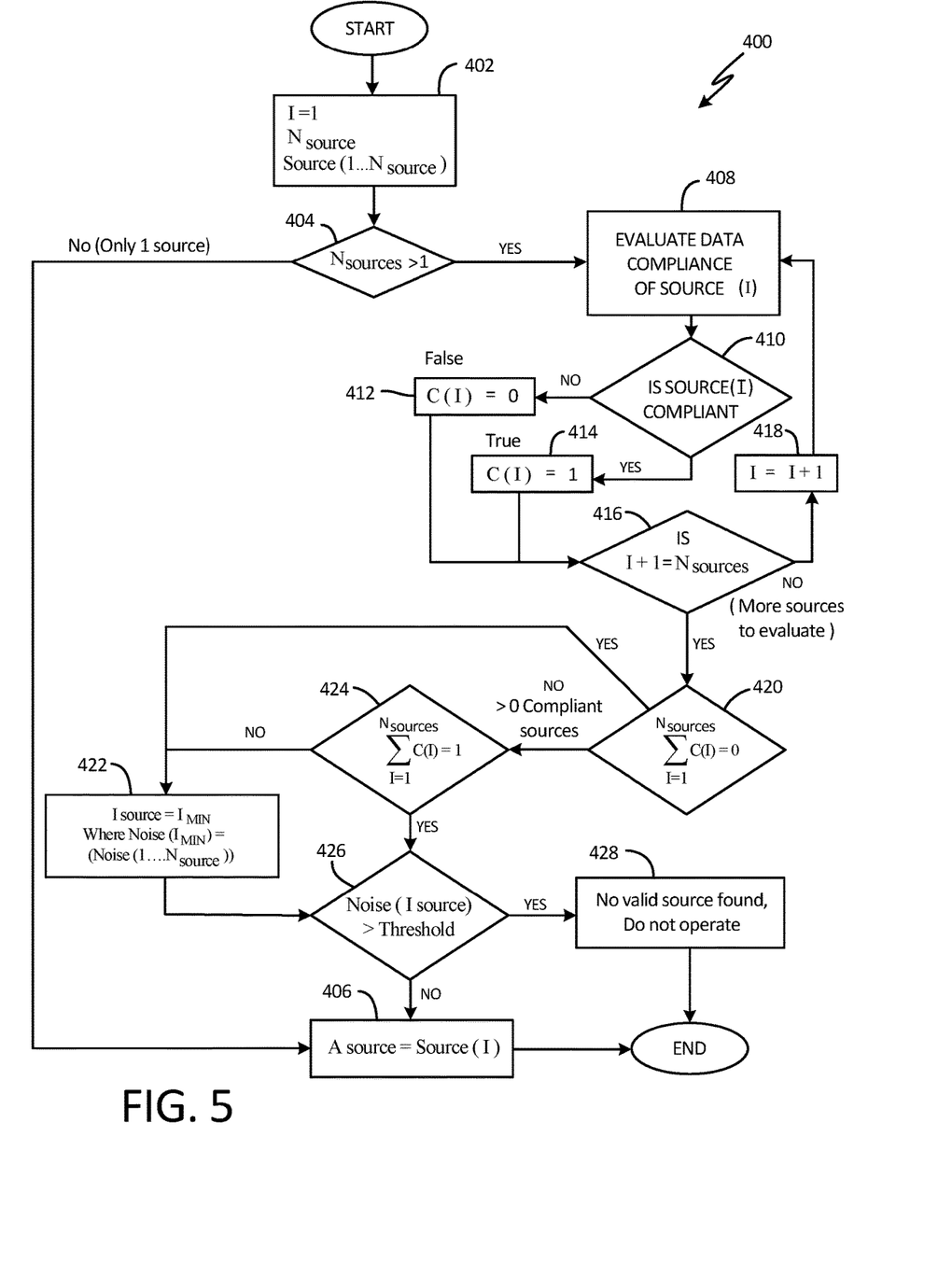
FIG. 5 is a flow chart of an exemplary method for selecting a speed signal from a plurality of sources that communicate a speed signal to the vehicle communications port.

FIG. 5 is a flow chart of an exemplary method for selecting a speed signal from a plurality of sources that communicate a speed signal to the vehicle communications port. In FIG. 5, method 400 for selecting a speed signal from a plurality of sources is detailed from the vantage point of microprocessor 216 of FIG. 3. Method 400 begins at step 402, in which step: i) index I is initialized to zero; ii) microprocessor 216 retrieves the number of sources $N_{SOURCES}$ from data memory 230; and iii) microprocessor 216 retrieves a list of source addresses SOURCE(1 . . . $N_{SOURCES}$) from data memory 230. Then, at step 404, microprocessor 216 compares $N_{SOURCES}$ with 1. If, at step 404, the number of sources not greater than one, method 400 proceeds to step 406. At step 406, microprocessor 216 sets the source address $A_{SOURCE}$ equal to the single source in the source list—SOURCE(1), and method 400 ends. $A_{SOURCE}$ will be the address identifying the speed signals to be used for calculating the vehicle's deceleration. If, however, at step 404, the number of sources is greater than one, method 400 proceeds to step 408. At step 408, microprocessor 216 tests signals from SOURCE(I) for compliance with J1939 standards. Then at step 410, microprocessor compares the results of the compliance test at step 408 with compliance standards. If, at step 410, signals from SOURCE(I) are found to be not in compliance with compliance standards, method 410 proceeds to step 412, at which step Compliance C(I) is set to false. If, however, at step 410, signals from SOURCE(I) are found to be in compliance with compliance standards, method 410 proceeds to step 414, at which step Compliance C(I) is set to true.

Regardless of whether signals from SOURCE(I) are found to be in compliance, after both steps 412 and 414, method 400 proceeds to step 416. At step 416, microprocessor compares I+1 with $N_{SOURCES}$. If, at step 416, I+1 is not equal to $N_{SOURCES}$, then method 400 proceeds to step 418 where index I is incremented. Method 400 proceeds from step 418 back to step 408 where tests signals from next SOURCE(I) for compliance with J1939 standards. If, however, at step 416, I+1 is equal to $N_{SOURCES}$, then method 400 proceeds to step 420. At step 420, microprocessor compares the sum of all C(0 . . . $N_{SOURCES}$–1) with zero. If at step 420, the sum is equal to zero, method 400 proceeds to step 422. At step 422, microprocessor 216 determines the best source for use in calculating deceleration from the plurality of sources, all of which in this case are found not to be compliant with J1939 standards. In some embodiments, microprocessor 216 will determine a noise metric corresponding to signals from each of SOURCES (0 . . . $N_{SOURCES}$–1). Microprocessor 216 may, for example, use the source corresponding to a minimum noise metric value of all of the computed noise metrics. Microprocessor 216 sets the source address $A_{SOURCE}$ equal to the source selected using such a method, and the method ends.

If, however, at step 420, the sum of sources in compliance with J1939 standards is not equal to zero, method 400 proceeds to step 424. At step 424, microprocessor tests to see if a single source is determined to be in compliance with J1939 standards. If, at step 424, only one source is found to be in compliance, method 400 proceeds to step 426. At step 426, microprocessor 216 sets the source address $A_{SOURCE}$ equal to the single source in compliance—SOURCE($I_{compliance}$), and method 400 ends. If, however, at step 426, more than one source is found to be in compliance, method 400 proceeds to step 422. At step 422, microprocessor 216 determines the best source for use in calculating deceleration from the plurality of sources that are found to be in compliance with J1939 standards. After step 422, method 400 ends.

In some embodiments, conditions for illumination of brake lights may be user configurable. For example, even if a vehicle is decelerating at a rate above a first predetermined threshold, if the vehicle throttle position is greater than a second predetermined threshold, the user may choose not to illuminate the vehicle's brake lights. Such a scenario could happen as a heavy truck is going up a steep hill, for example. In some circumstances, a user may choose not to illuminate the brake lights of the decelerating vehicle because the driver may not want a following user to think the driver is braking while driving up a hill, when in fact the driver is attempting to accelerate up the hill.

In an exemplary embodiment, a driver may configure an amount of hysteresis in activating/deactivating a brake light. A user, for example, may set both a first predetermined threshold of deceleration for activation and a second predetermined threshold of deceleration for deactivation. In some embodiments, a brake light timer may ensure that brake light activation has a duration that is always greater than a predetermined threshold. Such a system may prevent short duration illuminations of brake lights. In an illustrative embodiment, brake lights may be activated when the vehicle speed is below a predetermined threshold. Such a system will illuminate brake lights whenever a vehicle is stopped or moving at a low speed.

Various embodiments may have various advantages. For example, in some embodiments, a brake light control module may be retrofittable to a vehicle via the vehicle's vehicle communications port. In such embodiments, connecting the brake light control module to the vehicle's vehicle communications port augments the number or conditions that result in brake light illumination. For example, brake lights may be illuminated for vehicle conditions even without a driver activating a brake lever.

In some embodiments, automatic activation of brake lights may prevent rear-end accidents of vehicles so equipped. In some embodiments, vehicles that are stopped for whatever reason (e.g., accident, stall, traffic, etc.) will safely notify following vehicles of its stopped condition. In an exemplary embodiment, traffic patterns may improve as a result of improved communication of vehicular conditions on the road. For example, accordion-style traffic speed patterns may be reduced as following vehicles have early communication of vehicular speed and/or deceleration conditions. Traffic capacity of roads may increase as a consequence of such improved traffic patterns.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A brake light control system comprising:
   a control module configured to electrically connect to a vehicle communications port, the control module being physically supported by the vehicle communications port, when electrically connected, the control module including:
   a microprocessor configured to receive a plurality of series of vehicle speed signals transmitted to the vehicle communications port, wherein the microprocessor is further configured to select one of the received plurality of series of vehicle speed signals, the selected one being used by the deceleration calculator for calculating the deceleration;
   a deceleration calculator configured to calculate deceleration based on the selected one of the received plurality of series of vehicle speed signals; and
   a threshold comparator configured to compare the calculated deceleration with a predetermined threshold,
   wherein the microprocessor is further configured to generate a brake light activation signal based on the comparison of the calculated deceleration and the predetermined threshold,
   wherein the generated brake light activation signal is configured to cause an illumination of a standard brake light of a vehicle.

2. The brake light control system of claim 1, wherein each of the plurality of series of vehicle speed signals has an identification tag corresponding to a generating source of the series.

3. The brake light control system of claim 1, wherein operating power for the brake light control system is provided by the vehicle communications port.

4. The brake light control system of claim 3, further comprising a speed signal quality calculator configured to calculate a noise metric corresponding to each of the received plurality of series of speed signals.

5. The brake light control system of claim 4, wherein the selected one of the plurality of series of speed signals corresponds to a lowest one of the calculated noise metrics.

6. The brake light control system of claim 1, wherein the predetermined threshold is a first predetermined threshold, and the threshold comparator is further configured to compare the calculated deceleration with a second predetermined threshold that is less than the first predetermined threshold, wherein the microprocessor is further configured to generate a brake light deactivation signal if the calculated deceleration is less than the second predetermined threshold.

7. The brake light control system of claim 1, wherein the microprocessor is further configured to output the generated brake light activation signal to the vehicle communications port.

8. The brake light control system of claim 5, wherein the microprocessor is further configured to output the deactivation signal at or after a predetermined time following output of a preceding activation signal.

9. A method for activating a vehicle's brake lights comprising:
connecting a control module to a vehicle communications bus;
receiving a plurality of series of vehicle speed signals transmitted to the vehicle communications bus;
selecting one of the received plurality of series of vehicle speed signals, the selected one being used by the deceleration calculator for calculating the deceleration;
calculating a vehicle deceleration based on the selected one of the received plurality of series of vehicle speed signals;
generating a brake light activation signal based on a comparison between the calculated deceleration[and a predetermined threshold; and
outputting the generated brake light activation signal to the vehicle communications bus.

10. The method of claim 9 further comprising:
physically supporting the control module by a vehicle communications port.

11. The method of claim 9,
wherein each of the plurality of series of vehicle speed signals has an identification tag corresponding to a generating source of the series.

12. The method of claim 9, wherein selecting a series of vehicle speed signals from a plurality of series of speed signals includes calculating a noise metric corresponding to each of the plurality of series of speed signals received by the signal detection module.

13. The method of claim 12, wherein selecting a series of vehicle speed signals from a plurality of series of speed signals involves selecting the series of speed signals corresponding to the lowest of the calculated noise metrics.

14. The method of claim 9, wherein the predetermined threshold is a first predetermined threshold, the method further comprising generating a brake light deactivation signal based on the comparison between the calculated deceleration and a second predetermined threshold, the second predetermined threshold indicative of a deceleration that is less than a deceleration indicated by the first predetermined threshold.

15. The method of claim 14, further comprising outputting the generated deactivation signal at or after a predetermined time following a preceding activation signal was output.

16. The method of claim 9, further comprising:
receiving operating power for the control module from the vehicle communications bus.

17. A vehicle brake light control system comprising:
a control module having a non-transitory computer usable medium having a computer readable program code embodied therein, said computer readable program code adapted to be executed to implement a method for activating a vehicle's brake lights, the method comprising:
receiving a plurality of series of vehicle speed signals;
selecting one of the received plurality of series of vehicle speed signals, the selected one being used by the deceleration calculator for calculating the deceleration;
calculating a vehicle deceleration based on the selected one of the received plurality of series of vehicle speed signals;
comparing the calculated vehicle deceleration with a predetermined threshold;
generating a brake light activation signal based on the comparison of the deceleration and the predetermined threshold; and
outputting the generated brake light activation signal.

18. The brake light control system of claim 17, wherein the control module is physically supported by a vehicle communications port.

19. The brake light control system of claim 17, wherein the control module is electrically connected to a vehicle communications bus.

20. The brake light control system of claim 17, wherein the predetermined threshold is a first predetermined threshold, wherein the method further comprises:
generating a brake light deactivation signal based on the comparison between the calculated deceleration and a second predetermined threshold, the second predetermined threshold indicative of a deceleration that is less the a deceleration indicated by the first predetermined threshold.

21. The brake light control system of claim 20, wherein the method further comprises:
outputting the brake light deactivation signal at or after a predetermined time following a preceding outputting of a brake light activation signal.

* * * * *